United States Patent
Vitaldevara et al.

(10) Patent No.: US 8,959,159 B2
(45) Date of Patent: Feb. 17, 2015

(54) PERSONALIZED EMAIL INTERACTIONS APPLIED TO GLOBAL FILTERING

(75) Inventors: Krishna C. Vitaldevara, Fremont, CA (US); Eliot C. Gillum, Mountain View, CA (US); Jason D Walter, San Jose, CA (US); Robert McCann, Fall City, WA (US); Vasantha K. Vemula, Fremont, CA (US); Mehrdad Bidgoli, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 12/752,842

(22) Filed: Apr. 1, 2010

(65) Prior Publication Data

US 2011/0246584 A1 Oct. 6, 2011

(51) Int. Cl.
*H04L 12/58* (2006.01)
*G06Q 10/10* (2012.01)

(52) U.S. Cl.
CPC ............ *H04L 12/585* (2013.01); *G06Q 10/107* (2013.01); *H04L 51/12* (2013.01)
USPC .......................................... 709/206; 709/207

(58) Field of Classification Search
CPC ................................ H04L 12/58; G06F 21/00
USPC ......... 709/246, 224, 223, 217, 207, 206, 204, 709/201, 238, 226, 22, 225; 707/791, 740, 707/737, 713; 370/462; 715/751; 726/22, 2
See application file for complete search history.

(56) References Cited

U.S. PATENT DOCUMENTS

| | | | |
|---|---|---|---|
| 7,181,498 B2 | 2/2007 | Zhu et al. | |
| 7,219,148 B2 | 5/2007 | Rounthwaite et al. | |
| 2004/0167964 A1* | 8/2004 | Rounthwaite et al. | 709/206 |
| 2004/0177271 A1* | 9/2004 | Arnold et al. | 713/201 |
| 2004/0181462 A1 | 9/2004 | Bauer et al. | |
| 2006/0010217 A1* | 1/2006 | Sood | 709/206 |

(Continued)

OTHER PUBLICATIONS

"Anti-Spam for Exchange, Anti-Phishing and Email Management", GFI MailEssentials, Copyright 2008 Chicago Microsystems, Inc., website, http://www.chimicro.com/products/gfi/MailEssentialsFeatures.htm.

(Continued)

*Primary Examiner* — David Lazaro
*Assistant Examiner* — Charles Murphy
(74) *Attorney, Agent, or Firm* — Jim Ross; Tom Wong; Micky Minhas

(57) ABSTRACT

A computer implemented method for filtering unwanted bulk email in an email system and providing a positive user experience is provided. The method enables protection of email users from unsolicited bulk email using user-provided data on user interactions at both a user storage level and a global level with an email system. Metadata on user interactions with messages is collected. Messages are received by the system and evaluated using a global filter which assigns a score resulting in a message action. The action may be message delivery, message non-delivery or message routing, based on a score assigned by the global filter. When the message is delivered to user storage, the message may be examined relative to the metadata, and may alter the message action to an action different than the message action resulting from the score. Metadata for a plurality of users is returned to the global filter for use in making filtering future messages and modifies the global filter.

20 Claims, 7 Drawing Sheets

(56) References Cited

U.S. PATENT DOCUMENTS

2007/0220143 A1* 9/2007 Lund et al. .................... 709/224
2008/0244021 A1 10/2008 Fang
2010/0255817 A1* 10/2010 Chen et al. ................ 455/412.2

OTHER PUBLICATIONS

Attenberg, "Collaborative Email Spam Filtering with the Hashing Trick", Sixth Conference on Email and Anit-Spam, Jul. 16-17, 2009, 4 pages, Mountain View, California, USA.

"EmailLabs' Guide to Successful Email Delivery", High Performance Email Marketing, Email Labs, http://www.lyris.com/media/pdf/whitepapers/el-successful-email-deliverability.pdf.

Yoon, "Gmail and Spam Filtering", Edward J. Yoon's Blog, Mar. 4, 2009, http://blog.udanax.org/2009/03/gmail-and-spam-filtering.html.

Sakkis, "Learning How to Tell Ham from Spam", The ACM Student Magazine, http://www.acm.org/crossroads/xrds11-2/hamfromspam.html.

"Proofpoint Introduces Zero-Footprint User Self-Service Anti-Spam Controls", Press Release, Nov. 17, 2003, http://www.proofpoint.com/news-and-events/press-releases/pressdetail.php?PressReleaseID=59.

* cited by examiner

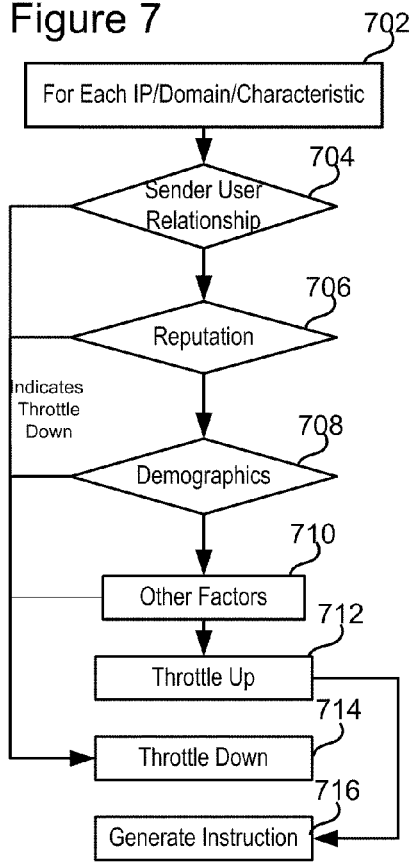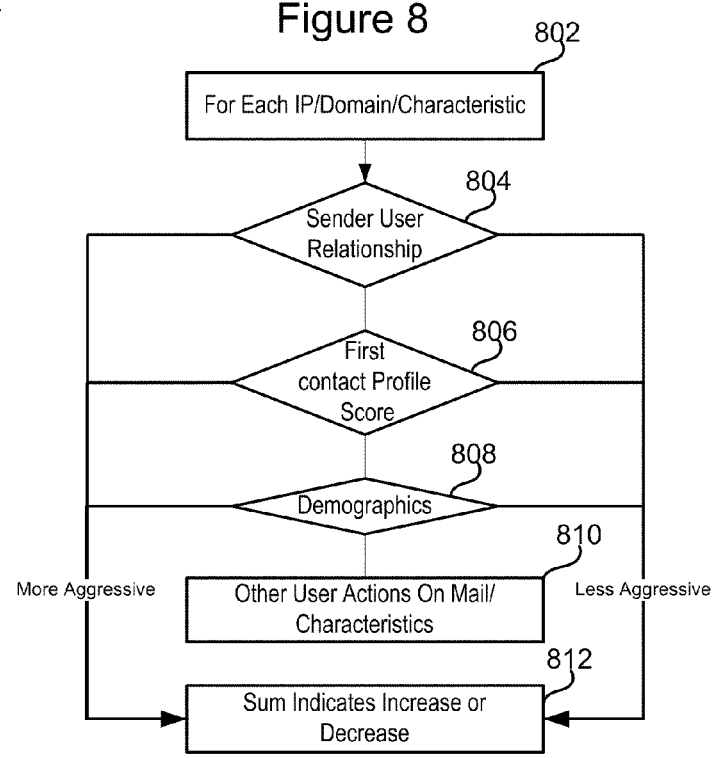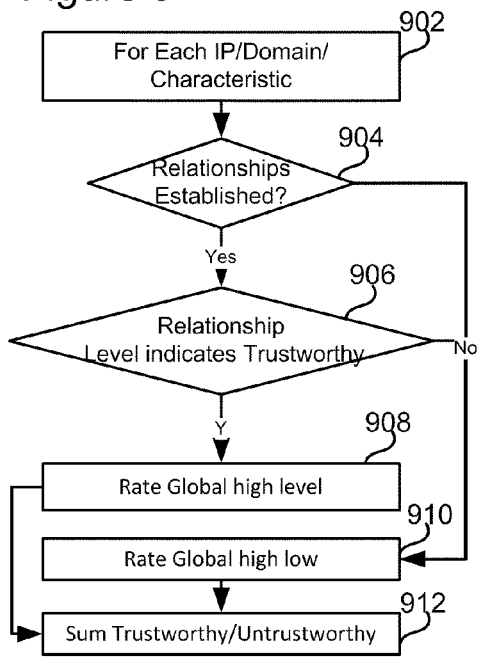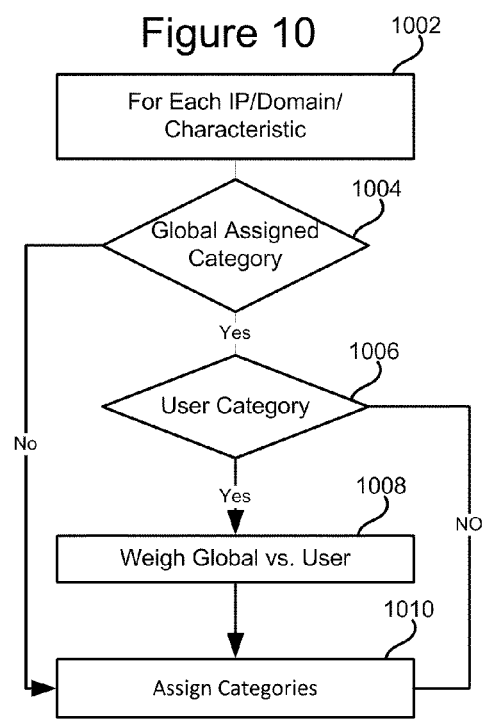

PERSONALIZED EMAIL INTERACTIONS APPLIED TO GLOBAL FILTERING

BACKGROUND

One of the most common forms of email is provided by Email Service Providers (ESPs) such as Yahoo! Mail, Microsoft Hotmail, Google GMail, and other web-based email services. In large scale ESPs, the problem of unsolicited bulk email messages (UBE), is acute. Issues also exist with providing users a positive experience with respect to gray mail—mail which may come from legitimate advertisers that some users may want to receive while others do not. Providers use a number of techniques in an effort to shield users from receiving UBE and correctly filter grey mail.

One issue with controlling the user experience in such systems is that filtering is generally applied on a global or system wide level. Generally, global filtering is applied to all users independent of any user preference. Drawbacks to global filtering may include difficulty in choosing whether to deliver gray mail. Gray mail may be considered bulk email that users may disagree on whether the message is spam or legitimate. Such mail may come from legitimate corporate senders that users have subscribed to, but who later classify the mail as spam.

Filter training by explicit user classifications via a user interface as limits the responsiveness of a mail system due to the inherent delay in receiving the feedback from a select number of users. In addition, users are generally not inclined to repeatedly provide feedback over time, and the accuracy of such feedback varies. For example, some users may classify mail from legitimate senders for whose emails they at one time opted to receive as "spam." Generally such feedback is not incorporated into global level filters for later use by the filter.

SUMMARY

Technology is provided to enable protection of email users from unsolicited bulk email and provide a positive user experience using user-provided data on user interactions at both a user level and a global level with an email system. Email messages are evaluated with a global filter and relative to user preferences determined based on user interactions with the system. Personalization data is applied when a global filter indicates that a message may be delivered to a user to further evaluate whether an action, such as delivery, disposal or routing to a folder should be taken on the message. The personalization data is returned to the global filter in order to train the global filter for future message interactions.

In one embodiment, a computer implemented method for filtering unwanted bulk email in an email system is provided. Metadata on user interactions with messages is collected. When messages are received by the system, the method includes filtering messages using a global filter and assigning a score resulting in a message action. The action may be message delivery, message non-delivery or message routing, based on a score assigned by the global filter. When the message is delivered to user storage, the message may be examined relative to the metadata, and the examination may alter the message action to an action different than the message action resulting from the score. Metadata for a plurality of users is returned to the global filter for use in filtering future messages, the metadata modifying the global filter.

BRIEF DESCRIPTION OF THE DRAWINGS

FIG. 7 is flowchart illustrating a method for controlling throttling using personal metadata from users.

FIG. 8 is a flowchart illustrating global filter training using personal metadata from users.

FIG. 9 is a flowchart illustrating sender reputation building using personal metadata from users.

FIG. 10 is a flowchart illustrating sender classification using personal metadata from users.

DETAILED DESCRIPTION

Technology is provided to enable protection of email users from unsolicited bulk email and provide a positive user experience using user-provided data on user interactions with an email system. User interactions and preferences with individual user data storage is used to improve the user experience with an email system at both the storage level and the global level. Personalization data is applied when a global filter indicates that a message may be delivered to a user to further evaluate whether an action, such as delivery, disposal or routing to a folder should be taken on the message. The personalization data is returned to the global filter in order to train the global filter for future message interactions.

Figure 1:
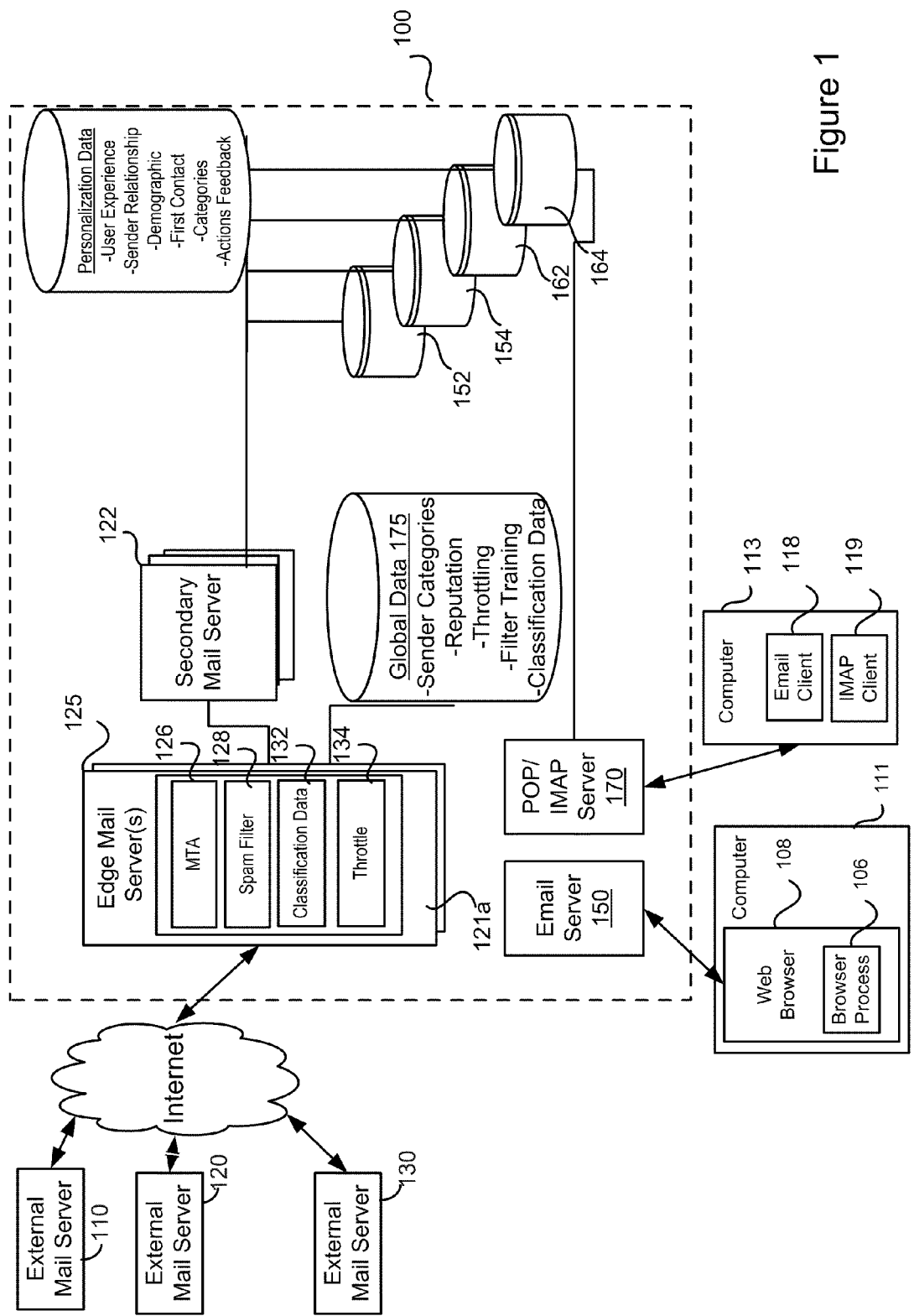
FIG. 1 is a block diagram of an email system suitable for implementing the present technology.
Figure 11:
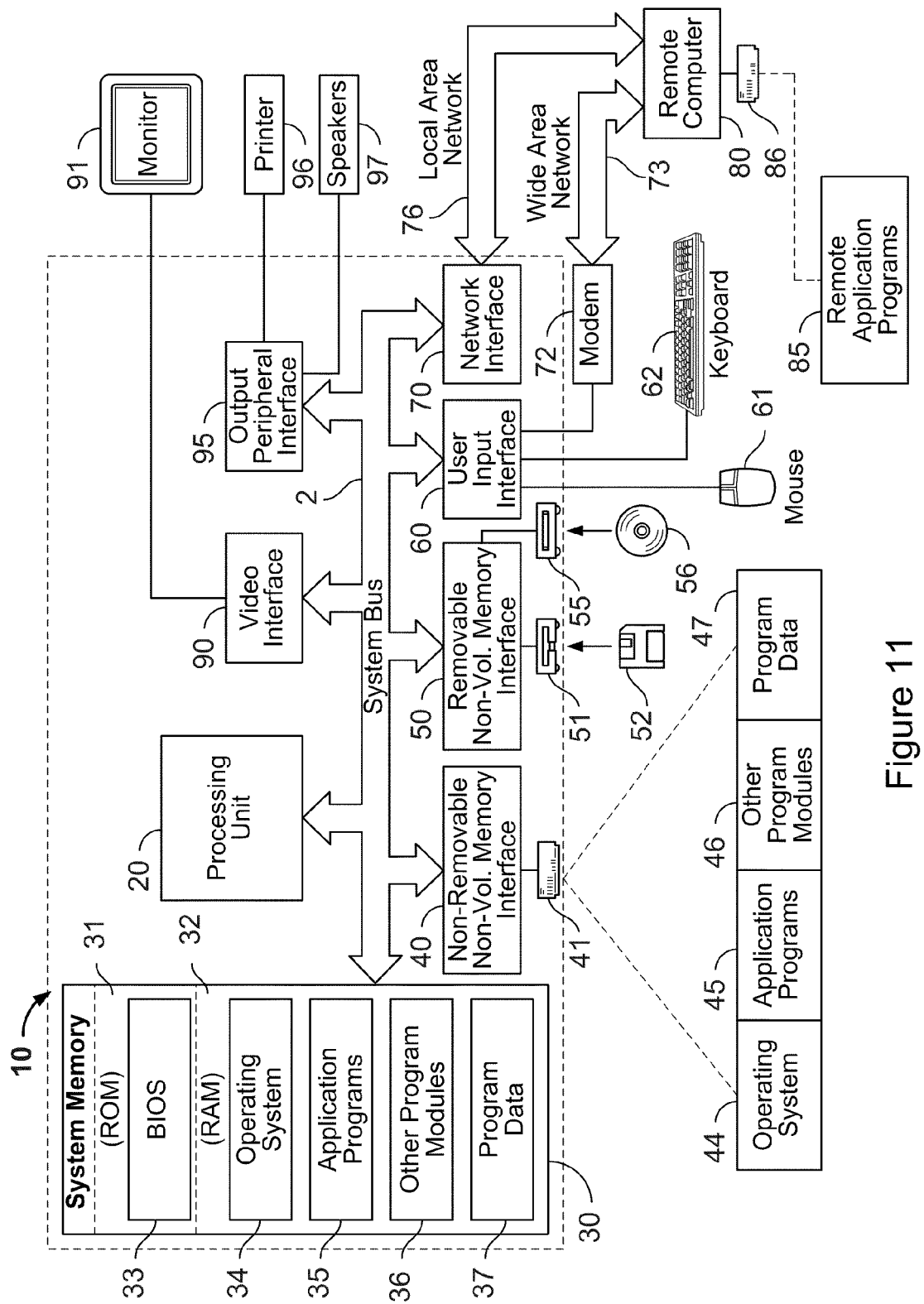
FIG. 11 illustrates a processing device suitable for implementing the present technology.

FIG. 1 illustrates a simplified view of a distributive e-mail system 100 in which the technology may be implemented. The system may use a number of computing devices although it will be understood that the technology disclosed herein can be implemented on a single computing device or on multiple computing devices organized in a different manner than those disclosed in FIG. 1. An exemplary computing device for implementing any of the processing devices illustrated in FIG. 1 is shown in FIG. 11.

FIG. 1 constitutes a block level diagram of system 100. System 100 is designed to allow users operating processing devices 111, 113 to access e-mail messages addressed to them which are processed and stored by system 100.

System 100 may consist of, for example, a series of edge mail servers 125 each of which contains a mail transfer agent 126, spam filtering agents 128, local classification data 132, and a throttling mechanism 134. The edge mail servers 125 transmit and receive messages to and from system 100 in various external entities 110, 120, and 130 each having their own mail transfer agent (not shown). Messages are transmitted between the external entities 120, 130, 110, and system 100 via any number of public or private networks, such as Internet 50.

System 100 may further include internal or secondary mail servers 122 which provide route message between edge mail servers 125 and data storage units 152, 154, 162, 164. In one embodiment, communication between different servers and storage units in system 100 is performed by simple transfer mail protocol (SMTP), though it will be recognized that any number of different communications mechanisms may be used. Secondary mail servers 122 work within system 100 to route mail to user storage 152, 154, 162, 164 for access by users of system 100. In a distributed system such as system 100, the work load for processing messages can be shared by various processing devices, with the work load divided into separate functions. The edge mail servers act as the point of contact to which messages transmitted via Internet 50 from a sending entity 110, 120, 130 to system 100 are directed. Edge servers 125 handle connections from the sending entities 110, 120, 130 and perform an initial set of acceptance and filtering tasks on inbound e-mail. The initial set of acceptance and filtering tasks can include conducting an initial protocol and blacklist check to determine whether to allow a connection from an external entity. Edge servers may further handle functions of forwarding e-mail messages from users of the e-mail system 100 to recipients at external entities 110, 120, 130. Edge servers 120 handle outbound lookup and connection tasks to route mail to external entities.

User data storage units 152, 154, 162, 164 store message data for individual users of the system in designated user locations. Users operating processing devices 111, 113 communicate with and view messages using, for example, web browser 108 instituting a browser process 106 communicating with a web e-mail server 150, or a dedicated e-mail client 118 or IMAP client 119 communicating with a POP IMAP server 170. Web e-mail server 150 and POP IMAP server 170 can access message storage locations for the individual user based on the user's unique identification name, such as user name, after the user authenticates the user's identity to gain access to the inner message store. Email server 150 may include components to enable the web browser to provide a user interface in the browser process 106, with the interface being any of a number of known interfaces enabling users to manipulate mail by composing new mail, reading inbound mail and organizing mail into various folders.

The system 100 may further contain global data store 175 which contains information which may be used by the edge servers 125 in making determinations on how to treat different messages. For example, global data 175 may include information on how to classify messages as being acceptable or unacceptable, spam or not spam, UBE or not UBE, and the like.

System 100 also includes a personalization data store 180 which contains user personalization metadata, described below, which characterizes how users of the system interact with various messages in their data store, and which can be used in conjunction with the technology disclosed herein to improve the user experience and alter how messages are treated by the edge mail servers 125.

As noted above, each of the edge servers 125 may include a message transfer agent which handles communication within system 100 and to external entities using a standard protocol, such as SMTP. The classifier 128 can include, for example, a spam filter, a content filter, phishing filter, and any number of other message rating filters which are used to determine whether messages directed to system 100 (and in one embodiment, emanating from system 100) are undesirable as comprising unsolicited bulk e-mail (UBE). UBE may comprise spam e-mails, phishing e-mails, or other e-mails which are directed to the users of the system and which are generally unwanted e-mail messages, frequently with commercial content generally sent in large quantities to an indiscriminate set of recipients. Classification filter 128 uses local classification data 132 to determine how to classify a particular message. Classification data can include known heuristics and message classification rating information which is used to classify an e-mail.

Throttling system 134 may be utilized by the edge mail servers to control the rate at which external entities 110, 120, 130 are allowed to communicate with the edge mail servers 125 in order to reduce or eliminate messages sharing similar characteristics. Throttling system 135 which may be utilized in accordance with the present technology is disclosed in co-pending United States Patent Application US 2006/0224673 A1, assigned to the assignee of the present application and specifically incorporated herein by reference.

Global data store 175 includes information which is centralized for all edge mail servers and which can be shared by the edge mail servers when updates to information in the classification data or throttling instructions need to promulgated throughout the system. Examples of the types of data which may be used in the global data store include sender categorization, sender reputation, throttling instructions, and filter scoring training. Information may be communicated from the global data store 175 to the edge servers on a periodic basis or continuously, using any number of known communication schemes.

In one aspect of the present technology, data in the global data store 175 is augmented by personalization data 180 which is derived for user interaction with the user's individual data stores. As described in co-pending United States Patent Application Publication No. 2007/0156886, assigned to the assignee of the present application and specifically incorporated herein by reference, user interaction with data stores can be tracked. Interactions in the co-pending application comprise tracking: the amount of time a user interacts with one or more messages in a user; whether a folder is specified by the user for storing one or more of the messages, whether a network routing is specified by the user (e.g. a forward or reply to an email), whether a follow up indication is specified by the user with one or more of the messages, whether a rule specified by the user of reprocessing messages engages the message. These interactions can supplement the global data 175 and may be utilized by system 100 in order to determine whether or not to classify messages in a certain manner, provide a reputation for a sender (at a personal level in US 2007/0156886) or control the rate of acceptance of messages sharing similar characteristics.

Classification data stored in the global data store 175 may include characteristics about messages which may be considered to be a potential indicator that the message is UBE. Global data store 175 may include information culled from various sources within and without of e-mail system 100. Database 175 may receive, for example, feedback from edge servers 125 when e-mail having a given characteristic is seen multiple times.

In addition, global data may include categorization information for certain senders. Senders, such as known commercial senders, can be classified as business senders, while individuals or smaller entities may be classified as personal senders. System 100 can use this information to determine whether or not certain classifications of senders should be treated differently from others. In one instance, sender categories are exposed to users of the system. Edge servers 125 can pre-populate the sender categories for individual messages where the category of the message can be detected based on the properties of the message. Categories may be collected from users, or be pre-sent by an administrative entity controlling system 100.

Global database 175 may also include sender reputation information. Sender reputation information can include data on whether a sender, defined as an IP address, domain, individual user address, or any identifying characteristic of a sending entity, can be considered a trustworthy sender or not. Sender categorization information can be derived from user interaction, or it can be established by an administrative entity of system 100. Throttling information contained in global database 175 may include determinations made by the system 100 as to whether or not to block messages emanating from a particular sending entity or limit the number of messages which may be received by the entity in a particular unit of time. Filter training information can include information both derived from information received within system 100 and from third party filter information providers which allow the classifier 128 to determine how to classify inbound messages.

Personalization data store 180 includes metadata which is derived from the user's interaction with data stores 152, 154, 162, 164. As described below, the metadata is collected when a user interacts with information in their data store, or by explicit feedback provided by the users. Personalization data 180 can include, for example, a user experience score, sender relationship information, user demographic information, a user first contact profile, and user feedback including user sender categorization, and user junk e-mail classification. The user experience score is a quantification of the experience each user is having interacting with system 100. A range of experiences are possible: receiving too much spam, receiving too much gray mail, receiving too much spam in their junk mail folder, receiving too many false positives in their junk mail folder, having an excellent experience. Quantification of the user's overall experience score can be used to adjust classification data and the aggressiveness of a personalized user experience.

Sender relationship information quantifies the existence, or lack of existence, of a relationship between a particular sender and a user. If a user reads a lot of e-mail from a particular sender, or forwards the mail, or uses any of the actions described in co-pending United States Patent Application Publication No. 2007/0156886, then the sender can be treated better than a sender who the user never reads mail from. Sender relationship information may exist on multiple levels based on messages received from senders who have relationship with either senders a user has a relationship with. For example, one may receive an email from a sender with whom the user may not have a relationship and which is addressed to another user with whom the user does have a relationship. This "friend-of-a friend" relationship can be quantified to have a positive or negative effect on the message, depending on the relationship with one's friend. In alternative embodiments, social networking information can be leveraged to provide a sender relationship or "friend-of-friend" status.

A first contact profile is a quantification of how a recipient reacts when the recipient receives mail from a first time sender. In many cases, mail from a first time sender is more likely to be spam than not. The first contact profile may indicate that a user generally tends to read new e-mail from new senders, or tends not to read e-mail from new senders. Certain types of users, such as advertisers or bloggers, may receive a significant amount of mail from first time users. Such a first contact profile would indicate that the user generally wishes to receive such e-mails. Conversely, other users may find all first time e-mail sent to them to be spam.

Personalization data 180 can also include user demographics. Both demographic data such as country, language and login patterns can be maintained. Demographic information can be used to help train global classification data 175. It is known that users in the United States receive one of the highest amounts of spam while users in Finland receive lower amounts of spam. In addition, the filter can know that Chinese users who primarily read Mandarin mail and tend to junk English mails could take advantage of the spam filter where messages with their non-preferred languages are treated more harshly.

In accordance with the present technology, personalized information from personalized data 180 is used to enable global applications at the edge servers 125 and to train the global database 175. Personalized data 180, culled from the user databases, can be used to provide real time feedback on new senders, real time spam filter content training, sender reputation building, and global categorization of recipients.

Information gathered from user specifications and interactions with individual user data storage is used to improve the user experience with an email system at the storage level (e.g. the user's personal level of experience) and the global level (for all users of the email system).

Figure 2:
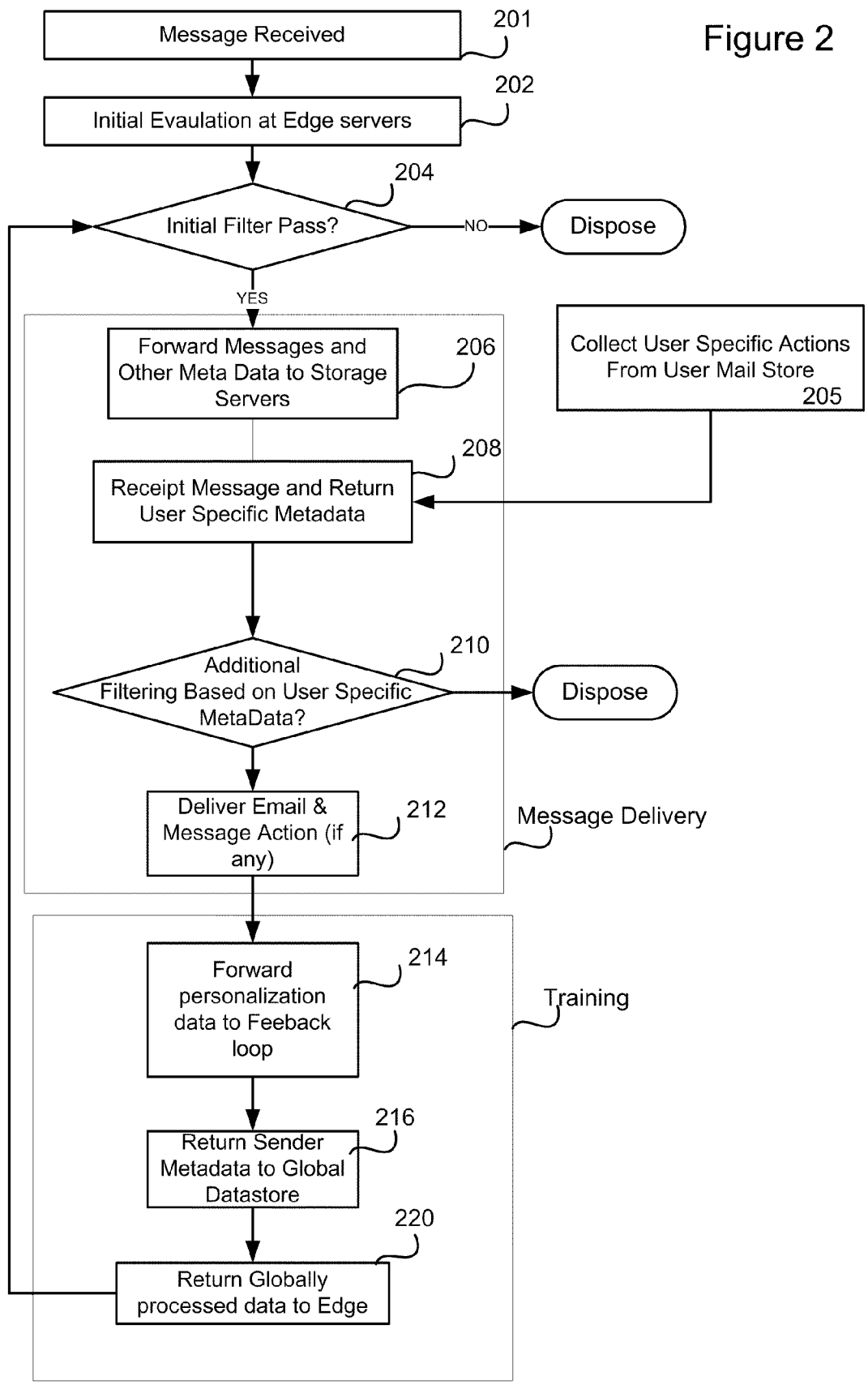
FIG. 2 is a flowchart illustrating a method in accordance with the present technology.
Figure 3:
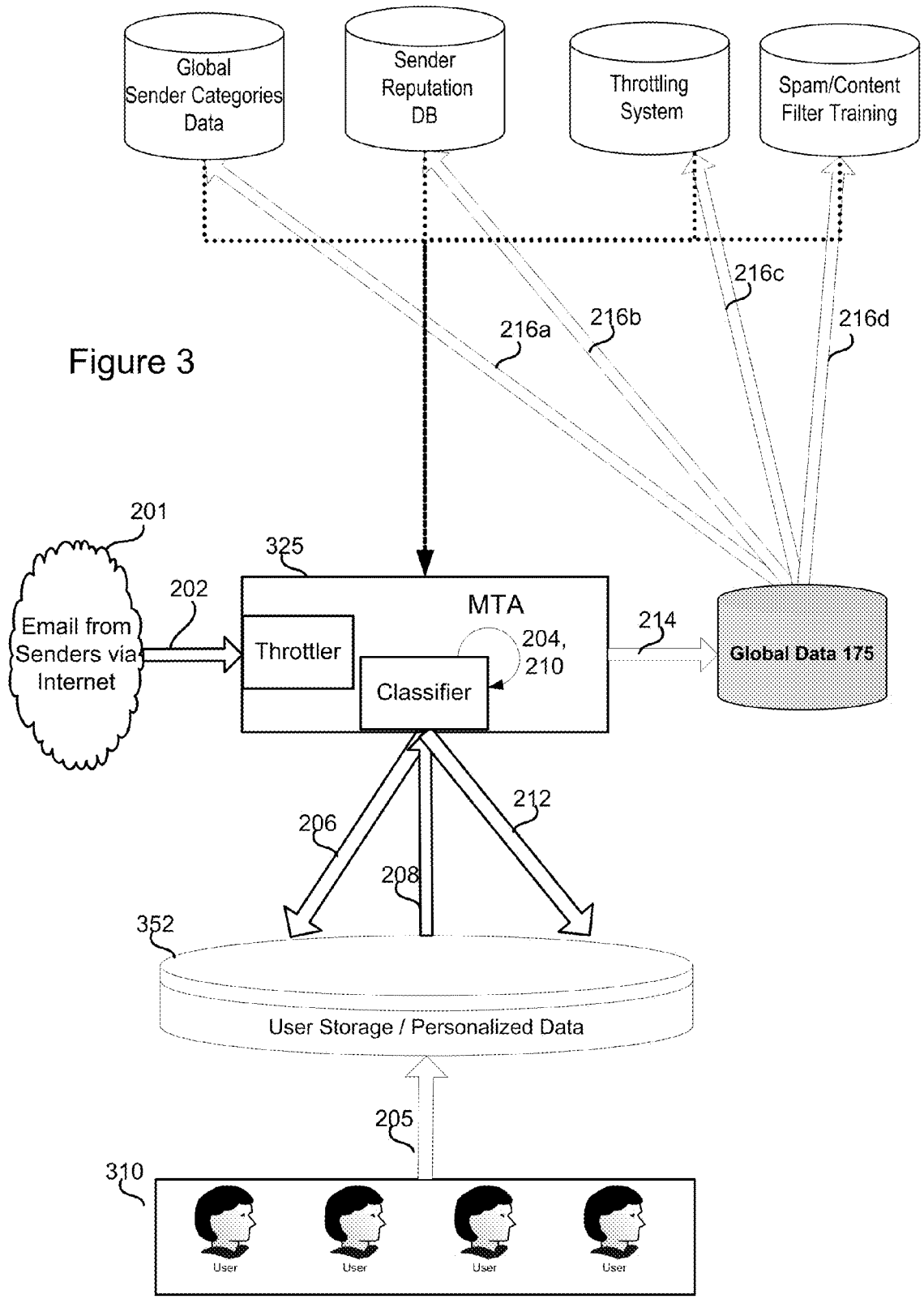
FIG. 3 is a state diagram illustrating the method of FIG. 2 in relation to logical components used in an email system

A method in accordance with the technology is disclosed in FIG. 2. FIG. 3 illustrates a state diagram illustrating data flow in relation to logical components used in an e-mail system. The logical components may be incorporated into the system 100 of FIG. 1, or provide them in a single processing device specifically programmed to perform the steps illustrated in FIG. 2 and include the logical components of FIG. 3, or may be provided on a multiplicity of processing devices in any distributed manner.

With reference to FIGS. 2 and 3, when an e-mail is received at step 201, an initial evaluation is made at the edge servers 202. This initial evaluation may include conducting basic protocol and blacklist checks to determine whether to allow an initial connection from a sending entity (such as entities 110, 120, 130) to a receiving MTA. If this initial evaluation is passed at 202, the e-mail message will be scanned for initial classification and content filtering at 204. This may be performed by the spam filter 128 or any other classifier mechanism. It the filtering at step 204 determines the message should not be delivered, it will be disposed of. If the filtering at 204 indicated that a message may be delivered to a user, the message will be delivered to user data storage with an indication of how the filter treated the message. Such indication may be one or more ratings indicating the potential that the message is a spam email or a phishing email. When the message is forwarded at 206, additional metadata, such as categories, authentication, and filtering results (e.g. a spam score or phishing score) are then forwarded to user storage.

When the message is forwarded at 206, the indication (or score) will enable an action at the user storage location. Such action may be one of delivering the message to the user's inbox, delivering the message to a SPAM folder, delivering the message to a deleted message folder, or not delivering the message. Any number of actions may be enabled by the indication from the global filter. The actions may be defined at the global level or the user level.

Concurrently, at 205, the technology tracks users' preferences across a number of different dimensions, and stores this information as personalization data 180. This can include user preferences regarding gray mail (wanted, unwanted, and false positives), good mail (wanted, unwanted, and false positives) and other mail (wanted, unwanted, and false positives). This mail breakdown may come from sender classification information that is attached to each type of sender. Users 310 accessing the mail system and their storage information add at least four categories of metadata regarding their use and senders they receive mail from and correspond with at 205. These categories include the user's overall spam experience score, the sender/user relationship, the first contact profile and preference, and user demographics.

Messages transmitted to user storage 352 at 206 will result in a return of personalized metadata information to the MTA 325 at 208. In one embodiment, storage 152 will accept the message and return the information for processing on the MTA 325. In alternate embodiments, processing may occur at user storage 152. Additional filtering occurs at step 210 based on the personalized metadata information returned. This additional filtering may change the characterization of the message and ultimately change the disposition of the message based on user preferences. If a message is to be delivered, at 212 the message is delivered with modified associated metadata. This modified data characterization of the message may alter the disposition of the message in user storage. This disposition may be to elevate what was previously classified as a spam message to a user's inbox, or remove a message from an inbox to a spam folder, or any number of other different variations for treating that mail. Examples of such additional actions which may be taken on the email include, but are not limited to: delivering the message to a folder indicative of a specific type of email; delivering the message to a deleted items folder of the user; destroying the message; displaying showing links and images normally blocked; categorizing the message by labeling the message (e.g. as a subscription, a transactional message, an order message or a travel related message; or prioritizing the mail in a user inbox folder or other folder, or a combination of these actions At 210 the message may be filtered more or less aggressively based on a user's overall mail experience score. This can alter the viewing and rendering of the message by, for example, render links and images by default for all shopping mail or classified grey gray mail senders if we realize the user loves their grey mail. Filtering at 210 can be disabled based on a Sender-User relationship for users who routinely correspond with each other. It could also become more aggressive on a sender that has never sent the user mail before. It could also combine the use of categorization with first time senders, or reputations, such that a first time gray mail sender is treated more harshly for a user who does not like gray mail, but a first time good sender is treated less aggressively but still aggressive because it is a first contact. If a message is still to be delivered to the user, at 212 delivery may be enabled by the MTA and new characterization information provided.

Personalized information is then returned to the global data store for training the global filter. 214, personalization data is fed back into a feedback loop in order to allow the global database to analyze and learn from the information provided by the users 310. In this context, sender metadata is returned to the global data store 216. This may include sending user categories for a specific sender back to the global system and the global system data store at 216A, sending the entire personalization data regarding sender reputation back to a sender reputation data store at 216B, sending user relationship data to a filter training system at 216C, and sending a sender/user relationship to throttling system data at 216D. This information is returned to the edge servers in terms of the categorization data at 220 for use in filtering new messages as they arrive.

The global filter, e.g. spam filter 128, is now capable of determining where the sender belongs in the spectrum of categories available to the filter. If a sender and user routinely correspond with one another, filtering could be completely disabled in other categories. Filtering could also become more aggressive on a sender that has never sent the user mail before. The features may be combined with the user's overall experience score where, for example, a first time gray mail sender is treated harshly for a user who does not like gray mail, but a first time good sender is treated less aggressive because it is a first contact.

Figure 4:
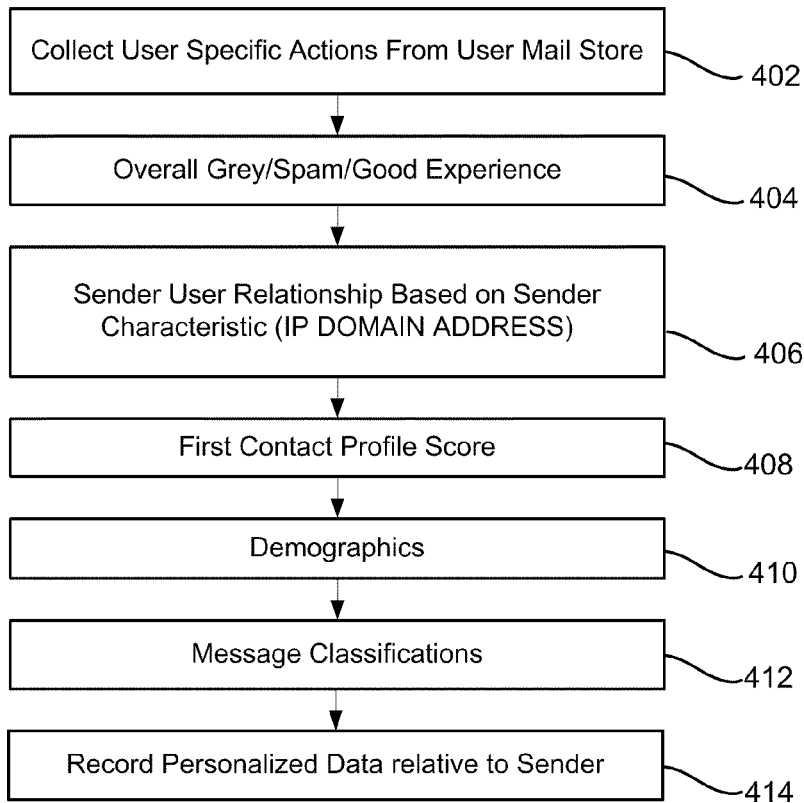
FIG. 4 is a flowchart illustrating user personal data collection in accordance with the technology.

FIG. 4 illustrates a method for collecting user information corresponding to step 205, above. At step 402, user specific actions on e-mail in the user's folder are recorded. This may include any of the variety of actions listed in US No. 2007/0156886. At 404, an overall spam experience score is assigned to the users. The spam experience score may be a simple integer definition on a rated scale, or may be a categorized definition based on the breakdown set forth above for gray mail, good mail, and other mail. A sender/user relationship factor is recorded at 406. The sender/user relationship will associate, with each sender, a characterization of the sender by the particular user. The sender/user relationship may be recorded relative to a specific email address, an internet protocol address, a domain or any other characteristic identifying a sending source. A first contact profile score is recorded at 408 which indicates whether a user tends to interact with email sent form first time senders or not. User demographics recorded at 410 indicate the user's location, language and other locations and languages the user tends to receive mail from. User specific sender categorizations are recorded at 412 and can be cross referenced against other data sets to determine how users treat categories of users. It should be understood that the factors listed in FIG. 4 are not exhaustive. Additional information may be recorded including whether the message passed authentication services implemented by the system. Personalized data on how users treat specific senders, based on their first time status, relationship, reputation, demographics are then recorded relative to each of the senders for which a record is maintained. Records may be maintained for each sender and each user, or after a sender interacts with a user over a threshold number of times.

Figure 6:
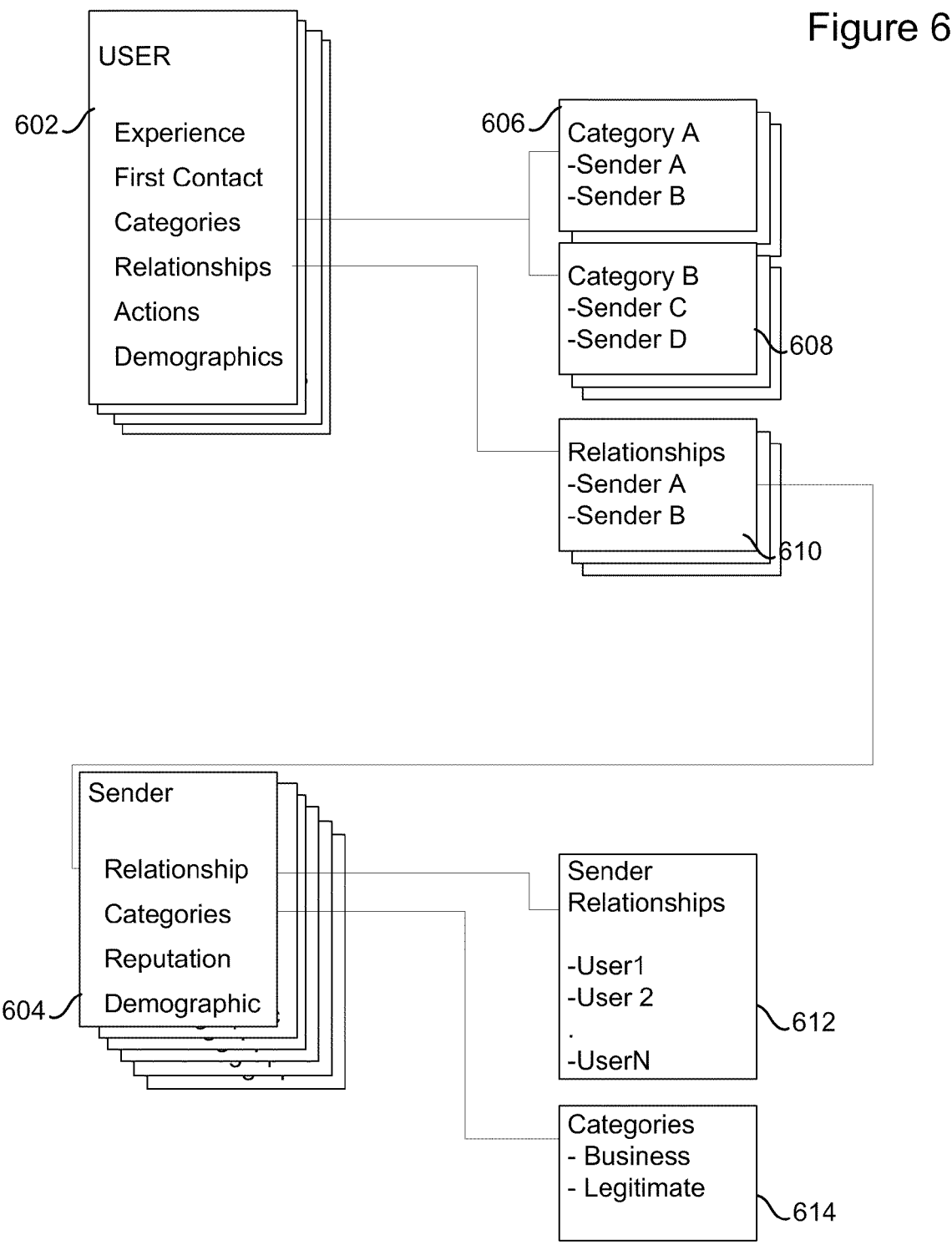
FIG. 6 represents a data structure which may be used in accordance with the technology.

FIG. 6 discussed below illustrates an exemplary diagram for how the data acquired in FIG. 4 may be related to other instances of data and utilized by the system of the present technology.

Figure 5:
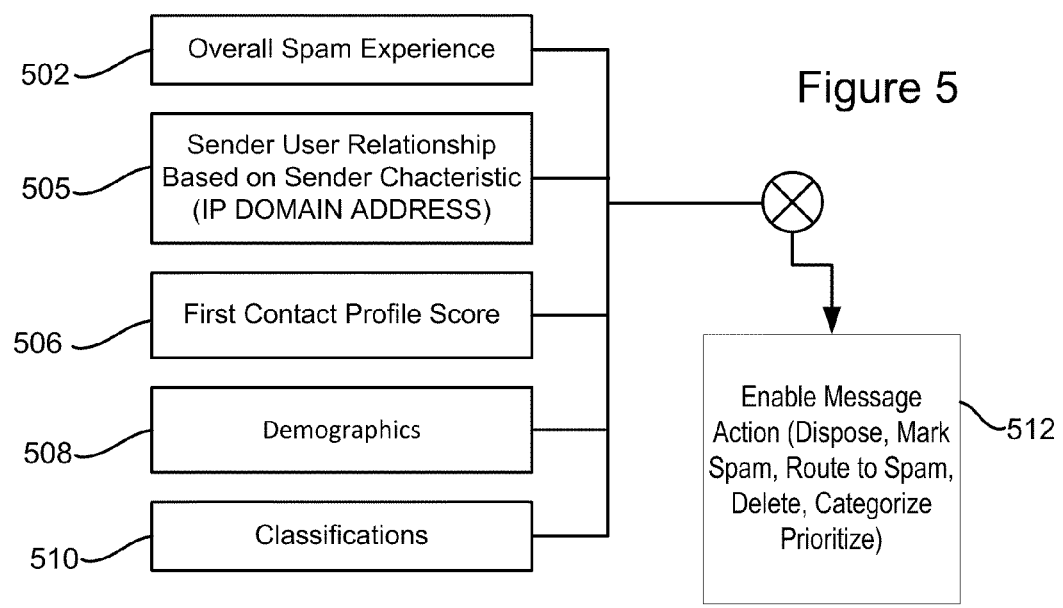
FIG. 5 is a flowchart illustrating a method of determining an action on a message in accordance with the technology.

FIG. 5 illustrates a method in accordance with step 210 of FIG. 2 for filtering of information based on returned personalized data. In FIG. 5, each of the elements acquired in step 205 may be assigned a characteristic weighting 502, 504, 506, 508 or 510. Each weight may itself be sufficient alone to classify a message as deliverable, or one which should be destroyed. Each of these weighted actions may be summed at 510 to enable a given message action at 512. The action may comprise delivering the message to a user inbox folder; delivering the message to a folder indicative of a specific type of email; delivering the message to a deleted items folder of the user; destroying the message; or prioritizing the mail in a user inbox folder or other folder, or a combination of these actions.

Any one or more of the data elements collected 502, 504, 506, 508 or 510 may be sufficient to enable an action at 512. Weighting of each of the elements 502, 504, 506, 508, 510 is dependent upon the system learning structure and the administrative entity running the e-mail system. For example, the sender/user relationship may be given a higher weight than a user demographic in the case where users regularly communicate, and an out of demographic language communication occurs between the sender and the user. Likewise, the sender/user relationship may be outweighed by classifications where spoofing of a particular sender's e-mail address or IP address has occurred, and the message is clearly spam.

FIG. 6 is an exemplary data structure 600 illustrating sender and user records which may be maintained by the system in order to transmit information regarding the various types of data accumulated. A user record 602 includes, for example, an experience score, first contact score, identified categories which the user assigns to particular senders, specific sender relationships the user maintains with other users and senders, user actions and user demographic information. The user assigned relationship may be linked to one or more sender records 604 to identify senders which the user has an established relationship. Each sender record 604 each which includes relationship data, categories data, reputation data, and demographic data about the sender culled from other users. In one implementation, each sender record may be linked to other sender records to enable a determination of additional levels of sender relationships. A user category record may include links to category records 606, 608 that are maintained for categories of various senders. Likewise, a relationships record 610 contains records of good and bad relationships and identified senders associated with those relationships. Similarly, the sender record 604 contains relationships to various users and categories record contains a link to a category record which maintains the various categories that users have placed the sender in.

FIG. 7 is a flow chart illustrating how a throttling instruction may be generated based on the personal data provided by users. For each sender at 702 (which may be an IP, domain or address, or other characteristic identifying a sender), the sender/user relationship is evaluated at 704 to determine whether or not that relationship indicates that throttling should be increased at 712 or decreased at 714. Likewise, the first contact profile score at 706 and user demographics at 708 are evaluated to determine whether or not the factor indicates throttling should be enabled for a particular characteristic or sender. Other factors are considered at 710. These other factors may contribute to throttling which may not originate with the users, such as the rate of messages received per unit of time from a particular sender. All such factors are evaluated for whether or not they indicate that throttling should occur or not occur. The sum of the relevant factors is calculated at 716 and an instruction generated at 718. The instruction may be provided to the throttling agent 134 to enable throttling at the edge servers.

FIG. 8 illustrates how the personalization characteristics can be utilized to train a characterizing spam or phishing filter. For each sender, IP, domain, characteristic, the sender/user relationship is evaluated at 804 to determine whether the relationship is established (thereby lessening the aggressiveness of the spam filter). If a relationship is established, the input from element 804 is that the filter should be less aggressive. Similarly, the first contact profile evaluated at 806, user demographics evaluated at 808, and other user actions on mail, such as those identified in co-pending Application Serial No. US No. 2007/0156886, are evaluated at 810. Each elements contribution to a more aggressive or less aggressive input to the filter and summed at 812 to determine whether or not each factor adds to deletes from weighting the message from that particular sender or characteristic as spam or not. The result of the weighting is returned to the classification data at 132.

FIG. 9 indicates how the personalization data can be used for reputation building. For each characteristic at 902, at 904 a determination is made as to whether relationships have been established with users and at 906 whether the relationship levels indicates that the characteristic is trustworthy. User ratings of a high level of trustworthiness and a low level of trustworthiness at elements 908 and 910, respectively, are summed to assign a reputation to the sender at 912.

FIG. 10 illustrates how the personalization information can be used to assign global categories to the domain, sender, IP or other characteristic. At 1002 for each IP, domain, sender or characteristic, a check is made at 1004 to determine whether a global assignment of a category has been made either by an administrative entity of the e-mail system or by other users. If the global category has been assigned, a weight is given to the global assignment at 1008. At 1006, a determination is made as to whether or not users have assigned categories to the characteristic and if so, a user weight is assigned at 1008. After summing the global classifications and user assigned classifications, a determination is made as to whether to assign specific classifications based on the frequency and/or weights assigned by the administrative entity to the user assigned and global assigned categories for the particular user at 1010.

FIG. 11 illustrates an example of a suitable computing system environment 600 such as a computer suitable for implementing any of the processing devices or servers described herein.

With reference to FIG. 11, an exemplary system for implementing the technology includes a general purpose computing device in the form of a computer 10. Components of computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 10 typically includes a variety of computer readable media. Computer readable media can be any available media that can be accessed by computer 10 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 10. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 11 illustrates operating system 34, application programs 35, other program modules 36, and program data 37.

The computer 10 may also include other removable/non-removable, volatile/nonvolatile computer storage media. By way of example only, Figure illustrates a hard disk drive 40 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media discussed above and illustrated in FIG. 11, provide storage of computer readable instructions, data structures, program modules and other data for the computer 10. In FIG. 11, for example, hard disk drive 41 is illustrated as storing operating system 44, application programs 45, other program modules 46, and program data 47. Note that these components can either be the same as or different from operating system 34, application programs 35, other program modules 36, and program data 37. Operating system 44, application programs 45, other program modules 46, and program data 47 are given different numbers here to illustrate that, at a minimum, they are different copies. A user may enter commands and information into the computer 20 through input devices such as a keyboard 62 and pointing device 61, commonly referred to as a mouse, trackball or touch pad. Other input devices (not shown) may include a microphone, joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. In addition to the monitor, computers may also include other peripheral output devices such as speakers 97 and printer 96, which may be connected through an output peripheral interface 90.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 11. The logical connections depicted in FIG. 11 include a local area network (LAN) 71 and a wide area network (WAN) 73, but may also include other networks. Such networking environments are commonplace in offices, enterprise-wide computer networks, intranets and the Internet.

When used in a LAN networking environment, the computer 10 is connected to the LAN 71 through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60, or other appropriate mechanism. In a networked environment, program modules depicted relative to the computer 10, or portions thereof, may be stored in the remote memory storage device. By way of example, and not limitation, FIG. 11 illustrates remote application programs 85 as residing on memory device 81. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that performs particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the system in various embodiments and with various modifications as are suited to the particular use contemplated. It is intended that the specific features and acts described above are disclosed as example forms of implementing the claims.

What is claimed is:

1. A computer implemented method for filtering email in an email system receiving messages transmitted to a recipient, the system having a global filter examining messages of multiple system recipients; comprising:

collecting metadata on recipient interactions with messages, the interactions being associated with characteristics of the messages;

receiving messages for multiple system recipients at a message transfer agent;

processing messages at the message transfer agent including classifying messages using the global filter by assigning a classification to each message resulting in a message action, the message action including message delivery, message non-delivery or message routing, based on the classification assigned by the global filter;

examining each message with a second filter based on the metadata specific to the recipient of the message, elements in the metadata for the recipient comprising a recipient experience score, a sender to recipient relationship, a first contact profile, and recipient interactions with email messages in a message store, said examining acting to alter the message action to a new action different than the message action resulting from the classification based on a weighting of at least one of the elements in the metadata, any one of the elements being sufficient to alter the message action; and modifying the global filter by updating the filter based on the metadata for a plurality of users for use in filtering future messages, the metadata modifying the global filter to increase or decrease global filter aggressiveness in characterizing a future message to result in message delivery to the user.

2. The method of claim 1 wherein the steps of examining and returning the metadata are preformed for every message sent to a user.

3. The method of claim 1 wherein the step of modifying includes supplying elements in the metadata based on at least one of any of recipient actions modifying the recipient experience score, the sender to recipient relationship, the first contact profile, and the recipient interactions with email messages in the message store.

4. The method of claim 3 wherein each of the elements of metadata is provided a significance weight in said examining step.

5. The method of claim 3 wherein the first contact profile is a quantification of a user's relationship with messages received from first time senders from whom the user has never received a message, and the quantification indicates whether the user is likely to read messages from first time senders or not likely to read messages from first time senders.

6. The method of claim 5 wherein the method further includes examining using one of the first contact profile in combination with at least a message category or user interactions to determine the new action.

7. The method of claim 1 wherein the new action may comprise one of:
   delivering the message to a user inbox folder;
   delivering the message to a folder indicative of a specific type of email; or
   delivering the message to a deleted items folder of the user; or
   destroying the message; or
   categorizing the message as a particular type; or
   highlighting the message in a user folder; or
   prioritizing the message in a user inbox folder
   destroying the message and sending a DSN failure notification; or
   returning the message to its sender.

8. The method of claim 1 wherein the method further includes:
   prior to receiving, controlling acceptance of message delivery requests by the message transfer agent based on the metadata delivered in said modifying.

9. A computer implemented method for controlling delivery of email messages to users in an email system, comprising:
   receiving a plurality of email messages for a plurality of users at the email system;
   filtering each of the plurality of messages using a global email filter, the filtering classifying each message with a classification which results in a first action type being associated with the message;
   delivering each of the messages with a classification to a user email store with the classification associated with the message;
   receiving email user metadata for a user who is a recipient of the message when delivering the message;
   examining each message based on a second filter, the second filter responsive to the email user metadata specific to the user, the metadata including elements comprising a recipient experience score, a sender to recipient relationship, a first contact profile, and recipient interactions with email messages in a message store, the second filter determining whether a change to the classification should occur based on a weighting of at least one of the elements in the metadata, any one of the elements being sufficient to alter the message action, and if so, changing the classification of the message and thereby changing the first action type on the message;
   collecting user metadata for the plurality of users, the user metadata comprising a sender to user relationship, a first contact profile, user demographics, and user interactions with email messages in the user email store;
   delivering the user metadata to the global filter filter to modify the global email filter for future messages having similar characteristics to increase or decrease aggressiveness in characterizing a future message prior to delivering the future message to said examining.

10. The method of claim 9 wherein one element of metadata collected can itself be determinative of the message action on the message at either the filtering or examining steps.

11. The method of claim 10 wherein the action may comprise one of:
   delivering the message to a user inbox folder;
   delivering the message to a folder indicative of a specific type of email; or
   delivering the message to a deleted items folder of the user; or
   destroying the message; or
   categorizing the message as a particular type; or
   highlighting the message in a user folder; or
   prioritizing the messages in a user inbox folder; or
   destroying the message and sending a DSN failure notification; or
   returning the message to its sender.

12. The method of claim 10 wherein the step of filtering and includes filtering inbound and outbound messages and the step of examining includes filtering inbound and outbound messages.

13. The method of claim 12 wherein the method further includes:
   controlling acceptance of message delivery requests on the metadata delivered in the delivering step.

14. A computer implemented method controlling the delivery of messages to users in a mail system, comprising:
   collecting user preference information including at least user relationships with sending entities, user interaction relationships with first-time sending entities, and user demographic information;
   receiving a plurality of email messages at a message transfer agent, at least some of the plurality of messages addressed to users, the message transfer agent making an initial determination on whether to accept the message;
   following the initial determination, applying a global email filter to the messages, the filter applying a characterization resulting in an action on the message;

if the characterization indicates the message is deliverable, delivering the message to a user data store, the user data store returning user-specific email interaction data;

if the characterization indicates the message is deliverable, determining whether to change the action on the message based on user-specific metadata including at least a user experience score, a sender to user relationship, a first contact profile, and previous user interactions with email messages the user data store, and if so, changing the characterization of the message and thereby changing the chararacterization on the message;

returning the user-specific metadata for a plurality of users to the message transfer agent for use in making the initial determination on future messages and modifying the global filter to increase or decrease aggressiveness in characterizing a future message to result in message delivery to a user, the user-specific metadata based on at least one of any of user actions modifying the user experience score, the sender to user relationship, the first contact profile, and the user interactions with email messages in the message store.

15. The method of claim 14 wherein the steps of determining how to dispose of the message and returning user specific email interaction data are performed at intervals for messages of a given user.

16. The method of claim 14 wherein the step of determining includes adjusting a spam confidence level based on a user's overall spam experience score.

17. The method of claim 14 wherein the step of determining includes allowing or rejecting a message based solely on user-sender relationship or a user's first contact profile.

18. The method of claim 14 wherein the step of applying includes allowing or rejecting a message based on a sender relationship defined by evaluating multiple users sender-user relationships.

19. The method of claim 14 wherein the step of determining includes categorizing senders based on user preference information and applying the global email filter using categories.

20. The method of claim 14 wherein the step of determining alters the action based on user preference information, the action including message delivery, message non-delivery or message routing to a specific user folder.

* * * * *